(12) United States Patent
Bryant, III

(10) Patent No.: US 6,394,501 B1
(45) Date of Patent: May 28, 2002

(54) STRUCTURAL ASSEMBLY DEVICE

(75) Inventor: Melvin A. Bryant, III, Decatur, AL (US)

(73) Assignee: The United States of America as represented by the Adminstrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/528,792

(22) Filed: Mar. 16, 2000

(51) Int. Cl.$^7$ ................................................. F16L 13/02
(52) U.S. Cl. ....................... 285/21.1; 285/21.2; 285/363
(58) Field of Search .............................. 285/21.1, 21.2, 285/363

(56) References Cited

U.S. PATENT DOCUMENTS

| | | | | |
|---|---|---|---|---|
| 2,961,363 A | * | 11/1960 | Lowes ......................... | 156/294 |
| 5,156,420 A | * | 10/1992 | Bokor et al. ................ | 285/21.2 |
| 5,407,520 A | * | 4/1995 | Butts et al. ............... | 156/379.7 |
| 5,462,314 A | * | 10/1995 | Goto et al. ................. | 285/21.2 |
| 5,494,318 A | * | 2/1996 | Butts et al. ................ | 285/21.2 |

* cited by examiner

*Primary Examiner*—Lynne H. Browne
*Assistant Examiner*—Aaron M Dunwoody
(74) *Attorney, Agent, or Firm*—James J. McGroary

(57) ABSTRACT

A structural assembly device and method for securing together a pair of surfaces of two fusible materials wherein an electrically conductive thermal element is located between the surfaces which will melt, without substantially degrading, when heated. When the thermal element is heated, it is elevated to a temperature sufficient to melt the first and second elements and then is allowed to cool such that the first and second elements are joined to the thermal element and may be joined to each other as well.

8 Claims, 1 Drawing Sheet

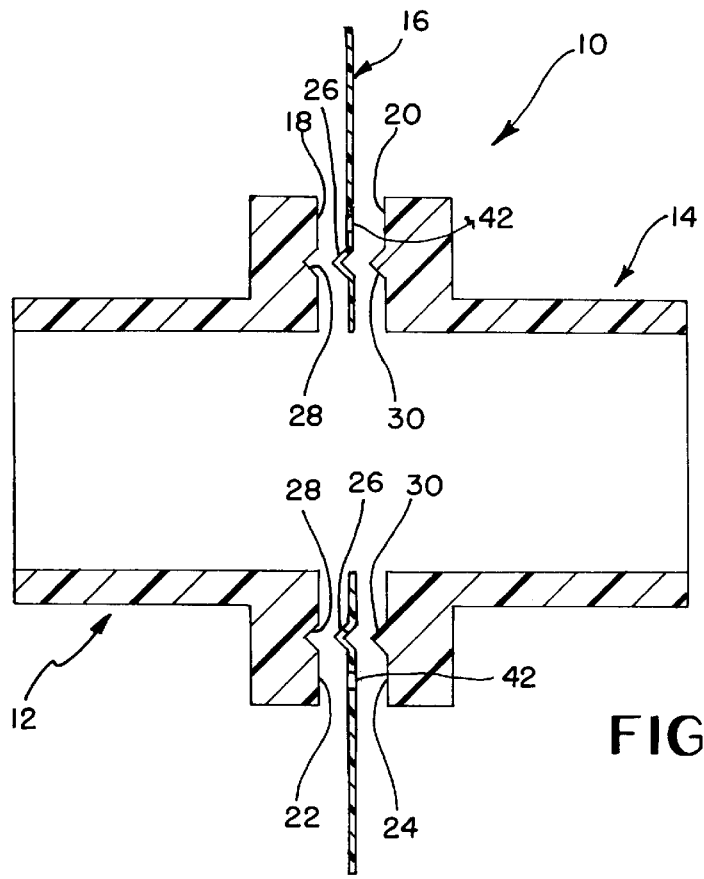
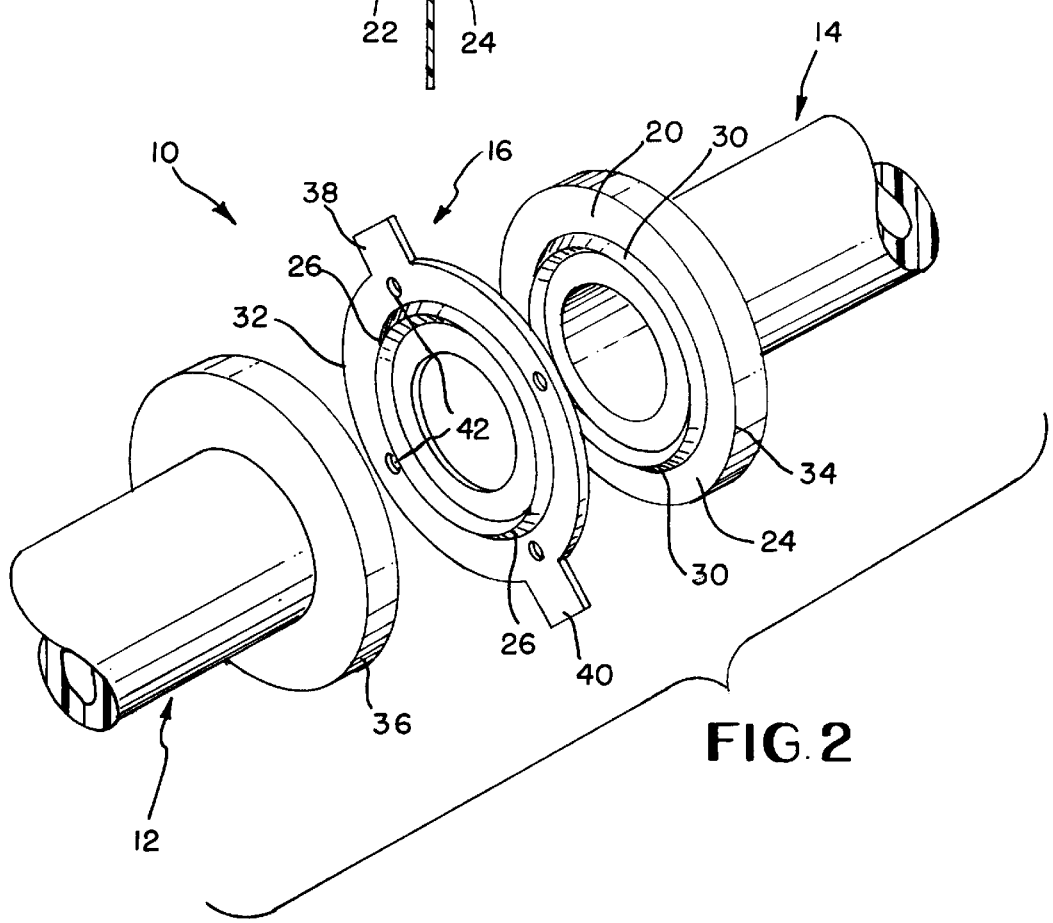

STRUCTURAL ASSEMBLY DEVICE

ORIGIN OF THE INVENTION

This invention was made by an employee of the United States Government and may be manufactured and used by or for the Government for governmental purposes without the payment of any royalties thereon or thereof.

BACKGROUND OF THE INVENTION

1. Field of the Invention

This invention relates to a method and apparatus for joining structural elements, and more specifically to a method and apparatus for joining plastic elements, such as plastic pipe.

2. Prior Art

Traditional means of joining two members, such as two pipes, include welding and bolting abutting flanges together. Other methods of joining two members together include the use of adhesives or tape. Still other methods of joining two members together include using interlocking hooks. Other mechanical and chemical connecting means may be known in the art as well.

A need exists for an efficient, cost effective way to join two structural members together without requiring the use of mechanical connectors.

Another need exists for joining two members together without requiring chemicals such as adhesives.

A further need exists for a method of joining two structural members while providing for disassembly at a later date.

SUMMARY OF THE INVENTION

Consequently, it is a primary object of the present invention to provide a cost effective means to join two structural members together without the use of mechanical connectors or chemicals.

It is another object of the present invention to provide a method of joining two structural members while providing for subsequent disassembly.

Accordingly, the present invention provides a method and apparatus for joining together two structural members, preferably plastic members, including the use of a thermal element residing between adjoined or conjoined members. The thermal element uses electrical resistance exposed to electrical current to produce sufficient heat for the structured members to attach themselves to each side of the thermal element after melting and subsequent cooling. It is also possible that the two members may attach to each other as well during the cooling process. The thermal element preferably has a plurality of holes to facilitate bonding of the members to the element and/or to each other. The thermal element remains between the elements throughout operation and may be utilized for disassembly at some future date.

BRIEF DESCRIPTION OF THE DRAWINGS

FIG. 1 is an exploded cross-sectional view of a structural assembly device in accordance with the present invention; and FIG. 2 is an exploded perspective view of the structural assembly device of the present invention.

DETAILED DESCRIPTION OF THE PREFERRED EMBODIMENT

Referring to FIGS. 1 and 2, a first member 12 and a second member 14 are illustrated which are intended to be joined together. The first and second members 12, 14 as illustrated are pipe sections; however, any appropriate pair of structural elements may be joined. A thermal element such as an annular element 16 is utilized to assist in the joining of the first and second member 12 and 4.

Materials which are suitable for the joining portions of the first and second members 12 and 14 include materials selected from the group of fusible alloys, synthetic, thermoplastic materials and brazing alloys. The joining portions or the entire first and second members 12, 14 may be constructed of these materials. Fusible alloys are those alloys which will melt at temperatures below about 250° C. Fusible alloys are usually binary, ternary, quaternary or quinery mixtures of bismuth, lead, tin, cadmium, indium and less frequently other metals. The term "low melting temperature" means a temperature below about 250 ° C. "Non-degradable" thermoplastic materials are those thermoplastic materials which will melt and do not degrade significantly when melted. For higher temperature applications, the joining faces may be brazing alloys. Brazing alloys are well known to those skilled in the art of brazing.

Some of the fusible alloys are:

EUTECTIC ALLOYS

| Melting Temp. ° C. | Percentage Composition | | | | |
|---|---|---|---|---|---|
| | Bi | Pb | Sn | Cd | Other |
| 248.0 | 0 | 82 | 0 | 18 | 0 |
| 221.0 | 0 | 0 | 96 | 0 | Ag 4 |
| 199.0 | 0 | 0 | 91 | 0 | Zn 9 |
| 183.0 | 0 | 38 | 62 | 0 | 0 |
| 144.0 | 60 | 0 | 0 | 40 | 0 |
| 143.0 | 0 | 31 | 51 | 18 | 0 |
| 138.56[1] | 58 | 0 | 42 | 0 | 0 |
| 138.5 | 57 | 0 | 43 | 0 | 0 |
| 130.0 | 56 | 0 | 40 | 0 | Zn 4 |
| 124.3[2] | 55.5 | 44.5 | 0 | 0 | 0 |
| 102.5 | 54 | 0 | 26 | 20 | 0 |
| 95.5 | 52 | 37 | 16 | 0 | 0 |
| 91.5 | 52 | 40 | 0 | 8 | 0 |
| 78.8 | 57 | 17 | 0 | 26 | 0 |
| 70.0[3] | 50 | 26.7 | 13.3 | 10 | 0 |
| 70.0[4] | 50 | 27 | 13 | 10 | 0 |
| 58.0[5] | 49 | 18 | 12 | 0 | In 2 |
| 46.9[6] | 44.7 | 22.6 | 8.3 | 5.3 | In 19.1 |

NON-EUTECTIC ALLOYS

| Yield Temp. ° C. | Melt Range, ° C. | Percentage Composition | | | |
|---|---|---|---|---|---|
| | | Bi | Pb | Sn | Other |
| 159 | 145–176 | 12.6 | 47.5 | 39.9 | 0 |
| 154 | 143–163 | 14 | 43 | 43 | 0 |
| 145 | 130–173 | 20 | 50 | 30 | 0 |
| 142 | 120–152 | 21 | 42 | 37 | 0 |
| 135 | 129–132 | 5 | 32 | 45 | Cd 18 |
| 127 | 124–130 | 56 | 2 | 40.9 | In 0.4 Cd 0.7 |
| 116 | 103–227 | 48 | 28.5 | 14.5 | Sb 9 |
| 111 | 95–143 | 33.3 | 33.4 | 33.3 | 0 |
| 100 | 95–114 | 59.4 | 14.8 | 25.8 | 0 |
| 96 | 95–104 | 56 | 22 | 22 | 0 |
| 89 | 83–92 | 52 | 31.7 | 15.3 | Cd 1.0 |
| 72.5 | 70–90 | 42.5 | 37.7 | 11.3 | Cd 8.5 |
| 64.0 | 61–65 | 48 | 25.6 | 12.8 | Cd 9.6 In 4.0 |

Fusible Alloy Examples

| Material | Approx. M.P. ° C. | Bi | Pb | Sn | Cd |
|---|---|---|---|---|---|
| Material A | 138.6 | 58 | 0 | 42 | 0 |
| Material B | 123.8 | 55.5 | 44.5 | 0 | 0 |
| Material C | 100 | 50 | 28 | 22 | 0 |

-continued

| Material D | 95 | 50 | 31   | 19   | 0    |
|------------|----|----|------|------|------|
| Material E | 93 | 50 | 25   | 25   | 0    |
| Material F | 71 | 50 | 24   | 14   | 12   |
| Material G | 71 | 50 | 25   | 12.5 | 12.5 |
| Material H | 70 | 50 | 27   | 13   | 10   |
| Material I | 70 | 50 | 26.7 | 13.3 | 10   |

[1]Cerrotru; [2]Cerrobase; [3]Cerrobend; [4]Lipowitz's metal; [5]Cerrolow-136; [6]Cerrolow-117

Synthetic, thermoplastic materials joinable by this invention are those materials which will melt, without degrading, at temperatures below about 250° C. and will, preferably, wet the surfaces to be sealed to opposite sides of the thermal element. Such materials include hot melt adhesives, nylon, polyethylene and other plastics including polyvinyl chloride that are well known to those skilled in the art. It can readily be seen that the adjoining surfaces 18, 20, 22, 24 may be made of different materials. For example, the adjoining surfaces 18 and 22 may be made of a fusible alloy while the adjoining surfaces 20, 24 of the other member may be a synthetic, thermoplastic material. In the preferred embodiment, the layers on opposite sides of the thermal element melt at about the same temperature range.

This structural assembly device 10 and method could also be used in high temperature applications including the brazed-joining of lightweight components to each other using a thermal element about 60 ms thick coated with a bronze alloy which melts about 1,125° F. with a braze flux type B-(1000–1700° F.). This application is particularly suited to vacuuming systems, catalytic converters and refrigeration systems.

There are many brazing alloys. Some of the most common are:

| Brazing Alloy Examples | | | | | | |
|---|---|---|---|---|---|---|
| Composition A | Cu | Ag | Zn | Cd | P | Melting Range, ° C. |
| Composition B | 99+ | | | | | 1083 |
| Composition C | 50 | 50 | | | | 778–850 |
| Composition D | 15.5 | 50 | 16.5 | 18 | | 627–734 |
| Composition E | 93 | | | | 7 | 704–800 |
| Composition F | 28 | 72 | | | | 778 |
| Composition G | 34 | 50 | 16 | | | 695–775 |

Various brazing fluxes may be used with these brazing alloys. Those skilled in the art of brazing will be familiar with brazing alloys and the brazing fluxes which will work best with each alloy. The brazing flux may be brushed onto the brazing alloy and protected by a thin layer of paper or plastic until the thermal element is to be used. Or, the flux may be brushed onto the brazing alloy at the point of use.

In operation, the structural assembly device is arranged with the opposed joining faces 18, 20, 22, 24 disposed with the thermal element 16 therebetween. Although the surfaces 18 and 22 and also the surfaces 20 and 24 are respectively the same surface in the embodiment illustrated, i.e., top and bottom portions of a pipe-like element, if the embodiment were, for example, a square end shape instead of circular, then these surfaces would be different. Adhesives, bolts or other mechanisms may, or may not, be utilized to assist in holding the first and second members together such as to create a preassembly. Preferably, an electric current is then passed through the thermal element 16 to melt at least portions of the opposed joining faces 18, 20, 22, 24. One or more detents or aligners, illustrated as notch 26, may be utilized as a self aligning feature of the thermal element. The notch, or notches 26, may fit within recessed portions 28. Additionally, protrusions 30 may assist in aligning the aligners 26 into the recesses 28 in order to provide the proper fit between the opposing joining faces 18 through 24. Other aligners may also be utilized.

A Vee type indention for the notch 26 has been found effective to locate the notch 26 in the recesses 28. The Vee type indention also assists the protrusion 30 in cooperating with the notch 26 in the thermal element 16 to properly fit together with the recesses 28 in the first member 12. FIG. 2 illustrates the notch 26 extending radially around a portion of the thermal element 16. Other cooperating arrangements may also be utilized to assist in the fitting together of the first and second members with the thermal element.

The thermal element 16 is illustrated as comprising a ring or annular member 32 in FIG. 2 having an inner diameter and an outer diameter. The ring member 32 may fit within the inner and outer diameters of the opposed flanges 34, 36. The opposed faces of the flanges 34, 36 are illustrated in FIG. 1 as joining surfaces 18–24. Alternatively, the inner diameter of the ring member 32 may correspond to the inner diameter of the flange member or members 34, 36 as illustrated in FIG. 1. The thermal element 16 may employ tabs 38, 40 to act as conductors to assist in heating the thermal element 16 by conducting or communicating electricity from one tab 38 to another tab 40. Other methods of heating the thermal element 16 may also be utilized.

The thermal element 16 may also have one or more orifices, illustrated as holes 42 which may facilitate bonding between the first and second members 12 and 14. The holes 42 may be of any geometric configuration so long as they are capable of communicating melted portions of the first and second members 12 and 14 with one another.

After a joint has been created, the assembly 10 may be utilized and later disassembled. If disassembly is desirable, a current may be introduced into the thermal element 16 to locally remelt the exterior surface portions 18–24. Once the surfaces 18–24 are no longer joined to the thermal element 16 or to each other, the two members 12, 14 may be separated.

This joining technology has many applications. One application is the commercial sign industry wherein the elements may have any geometrical configuration conventional for signs. Additionally, the joining of plastic pipe and subsequent disassembly is another practical application of the structural assembly method and apparatus taught herein. Furthermore, a portable enclosure support structure may be constructed utilizing the technology taught herein.

Numerous alternations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A structural assembly device comprising:
   a first pipe member having a first joining surface portion and at least a portion of the first joining surface portion having a first melting temperature;
   a second pipe member having a second joining surface portion and at least a portion of the second joining surface portion having a second melting temperature, said second joining surface portion located opposing said first joining surface portion;

a thermal element located between the first and second joining surface portions, said thermal element having a ring with an annulus and an inner and an outer diameter, wherein the inner diameter of the ring is greater than an inner diameter of the first and second joining surface portion and the outer diameter of the ring is less than an outer diameter of the first and second joining surface portion;

whereby when the thermal element is elevated in temperature to a temperature above the first and second melting temperatures portions of the first and second joining surface portions of the first and second members proximate to the thermal element melt; and whereby when the thermal element is permitted to cool to a temperature below the first and second melting temperatures the first and second joining surface portions solidify and join to the thermal element to create a composite unit.

2. The structural assembly device of claim 1 wherein the first and second joining surface portions are further joined to one another upon cooling of the thermal element.

3. The structural assembly device of claim 2 wherein the thermal element further comprises a plurality of openings therethrough.

4. The structural assembly device of claim 1, wherein the first and second pipe members are constructed of a plastic material.

5. The structural assembly device of claim 1, wherein the first and second joining surface portions are exterior flange portions.

6. The structural assembly device of claim 1 wherein the thermal element generates heat by running electrical current through portions of the thermal element.

7. The structural assembly device of claim 1, wherein the thermal element further comprises an aligner and said first and second joining surface portions have a cooperating portion, said cooperating portions cooperating with said aligner to locate said first and second pipe members relative to said thermal element.

8. A structural assembly device comprising:

a first pipe portion having a first joining surface;

a second pipe portion having a second joining surface; and a thermal element located between the first and second joining portions and having a ring with an annulus and an inner and an outer diameter, wherein the inner diameter of the ring is greater than an inner diameter of the first and second pipe portions, and the outer diameter of the ring is less than the outer diameter of the first and second pipe portions.

\* \* \* \* \*